(12) United States Patent
Iikawa et al.

(10) Patent No.: US 7,408,726 B2
(45) Date of Patent: Aug. 5, 2008

(54) LENS ALIGNMENT APPARATUS

(75) Inventors: Makoto Iikawa, Saitama (JP); Masashi Takahashi, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/427,552

(22) Filed: Jun. 29, 2006

(65) Prior Publication Data

US 2007/0002468 A1    Jan. 4, 2007

(30) Foreign Application Priority Data

Jun. 30, 2005    (JP)    ............................. 2005-192555
Jun. 30, 2005    (JP)    ............................. 2005-192556

(51) Int. Cl.
    *G02B 7/02*    (2006.01)
(52) U.S. Cl. ....................... 359/808; 359/823
(58) Field of Classification Search ................. 359/808, 359/823, 822, 811, 819
    See application file for complete search history.

(56) References Cited

U.S. PATENT DOCUMENTS 5,483,384 A * 1/1996 Takizawa et al. ............ 359/827

| | | | |
|---|---|---|---|
| 6,388,826 B2 | 5/2002 | Iikawa et al. | |
| 6,853,503 B2 | 2/2005 | Nomura et al. | |
| 6,853,506 B2 | 2/2005 | Saitoh | |
| 2002/0060828 A1* | 5/2002 | Ishizuka et al. ............. | 359/200 |
| 2004/0179277 A1* | 9/2004 | Stallard et al. .............. | 359/811 |

FOREIGN PATENT DOCUMENTS

JP    2001-208946    8/2001

* cited by examiner

*Primary Examiner*—Jordan M. Schwartz
*Assistant Examiner*—James C Jones
(74) *Attorney, Agent, or Firm*—Greenblum & Bernstein, P.L.C.

(57) ABSTRACT

A lens alignment apparatus includes a main lens holding frame having a main lens secured thereto; an adjusting lens holding frame to which an adjusting lens to be aligned with the main lens is secured; at least one radial groove formed in one of adjacent end surfaces of the main lens holding frame and the adjusting lens holding frame; a centering hole, corresponding to the radial groove, formed in the other of the adjacent end surfaces of the main lens holding frame and the adjusting lens holding frame; and an alignment member including a centering pillar portion inserted in the centering hole and an aligning portion engaged in the radial groove, the aligning portion being provided with a plurality of pairs of parallel alignment surfaces having an identical width and different distances from the axis of the centering pillar portion.

3 Claims, 13 Drawing Sheets

LENS ALIGNMENT APPARATUS

BACKGROUND OF THE INVENTION

1. Field of the Invention

The present invention relates to a lens alignment apparatus for correcting disalignment of a lens.

2. Description of the Related Art

Various lens alignment apparatuses for aligning an optical axis of a main lens (lens group) with an optical axis of an adjusting lens (lens group) upon assembly are known, and have been made commercially viable. The basic concept of such prior art lens alignment apparatuses is to continuously adjust the position of the optical axis of the adjusting lens relative to the optical axis of the main lens in a stepless manner. In such a stepless type of lens alignment apparatus, the operator is free to optionally select a desired adjustment position. However, lens products tend to have the same disalignment for each lot. Nevertheless, the operator must individually carry out an adjustment for each lens product to determine a correct position from different initial positions. Therefore, such disalignment adjustment is complicated and requires an increased amount of time. Moreover, the accuracy of the adjustment becomes irregular due to differences in the operator's skill or the quality of the lens products. Furthermore, once the lens assembly is disassembled, it is practically impossible to reproduce the aligned state thereof.

In view of the drawbacks of the prior art mentioned above, the present invention provides a lens alignment apparatus in which a lens alignment can be easily performed with a minimum number of operations and in a short time.

SUMMARY OF THE INVENTION

According to an aspect of the present invention, a lens alignment apparatus is provided, including a main lens holding frame having a main lens secured thereto; an adjusting lens holding frame to which an adjusting lens to be aligned with the main lens is secured; at least one radial groove formed in one of adjacent end surfaces of the main lens holding frame and the adjusting lens holding frame; a centering hole, corresponding to the radial groove, formed in the other of the adjacent end surfaces of the main lens holding frame and the adjusting lens holding frame; and an alignment member including a centering pillar portion inserted in the centering hole and an aligning portion engaged in the radial groove, the aligning portion being provided with a plurality of pairs of parallel alignment surfaces having an identical width and different distances from the axis of the centering pillar portion.

It is desirable for the lens alignment apparatus to have a pair of the radial grooves provided at angular intervals of 90 degrees.

It is desirable for the centering hole of the main lens holding frame and the centering pillar portion of the alignment member to have interengageable polygonal shapes.

According to the above-described structure, a lens alignment can be easily carried out by a minimum number of operations and the aligned state can be easily reproduced.

In an embodiment, a lens alignment apparatus is provided, including a main lens holding frame having a main lens secured thereto; an adjusting lens holding frame to which an adjusting lens to be aligned with the main lens is secured; a plurality of radial grooves formed in one of adjacent end surfaces of the main lens holding frame and the adjusting lens holding frame, the radial grooves being arranged on a common circle whose center is located on an optical axis; a plurality of alignment holes corresponding to the radial grooves, formed in the other of the adjacent end surfaces of the main lens holding frame and the adjusting lens holding frame, the alignment holes including at least one alignment pin hole and at least one regular polygonal hole; at least one alignment pin including a cylindrical pillar portion which is relatively rotatably inserted in the alignment pin hole, and an eccentric cylindrical pillar portion which is relatively rotatably fitted in one of the radial grooves, the eccentric cylindrical pillar portion being eccentric with respect to the cylindrical pillar portion; and at least one alignment member including a centering pillar portion which can be inserted in the regular polygonal hole at different angular phases, and an aligning portion which can be engaged in another of the radial grooves regardless of the angular phase with respect to the regular polygonal hole, the aligning portion being provided with a plurality of pairs of parallel alignment surfaces having an identical width and different distances from the axis of the centering pillar portion.

It is desirable for the alignment pin hole and the regular polygonal hole to be identical regular-polygonal shaped holes.

It is desirable for each of the alignment pin and the alignment member to be provided with a central insertion hole for a securing screw.

It is desirable for the radial grooves to include at least one radial through-groove in which the alignment pin is fitted and at least one radial bottomed-groove in which the alignment member is fitted.

It is desirable for the lens alignment apparatus to have four of the radial grooves provided at angular intervals of 90 degrees, wherein one of the radial grooves for the alignment pin and another of the radial grooves for the alignment member are aligned along a straight line passing through a center of one of the main lens holding frame and the adjusting lens holding frame.

It is desirable for the identical regular-polygonal shaped holes to include at least eight regular polygonal holes which are spaced at an equal angular intervals.

It is desirable for the alignment pin hole to be a circular hole.

According to the above-described structure, the lens alignment can be easily carried out with a small number of operations.

The present disclosure relates to subject matter contained in Japanese Patent Application Nos. 2005-192555 and 2005-192556 (both filed on Jun. 30, 2005) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
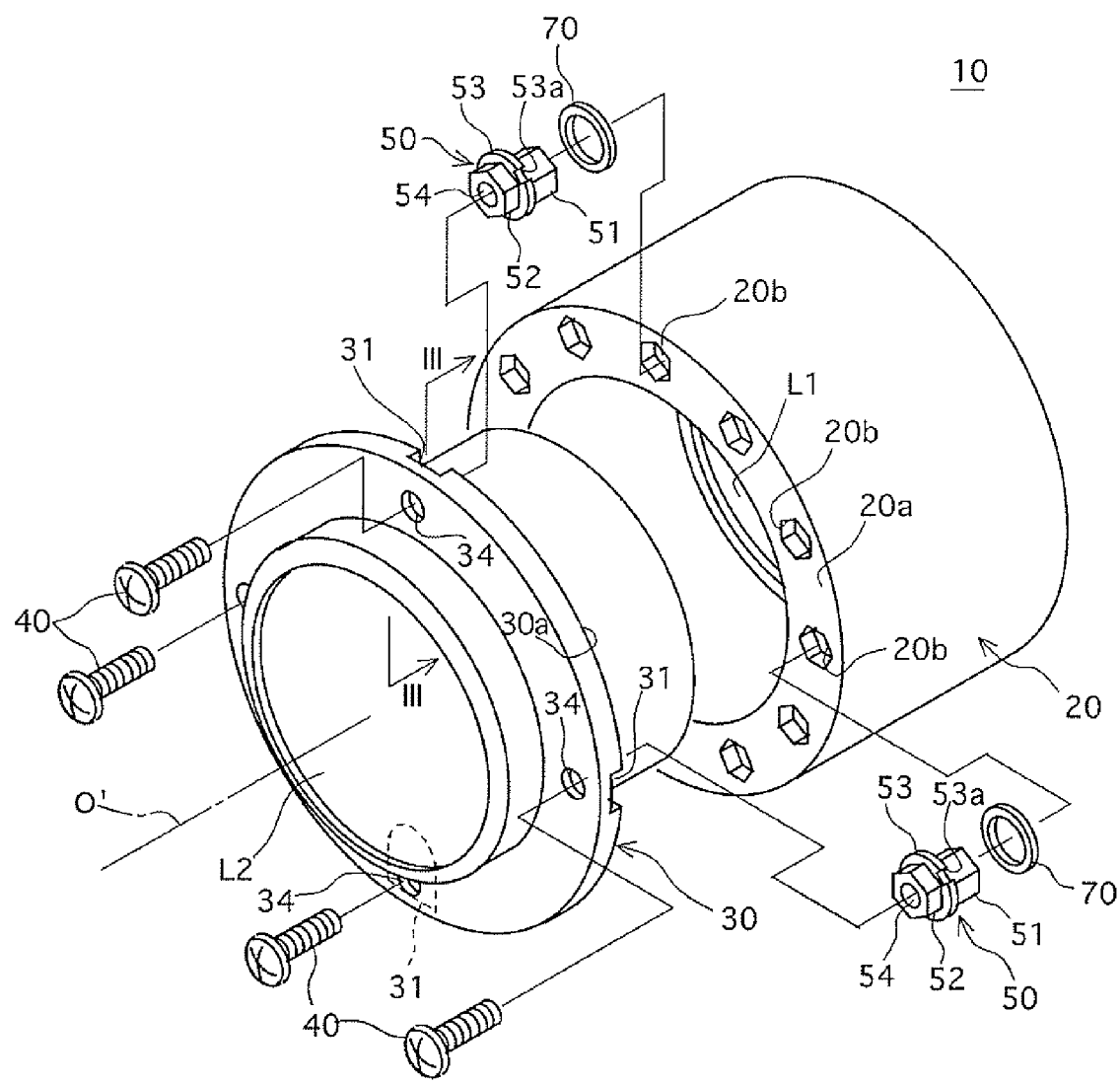
FIG. 1 is an exploded front perspective view of a lens alignment apparatus according to a first embodiment of the present invention.
Figure 2:
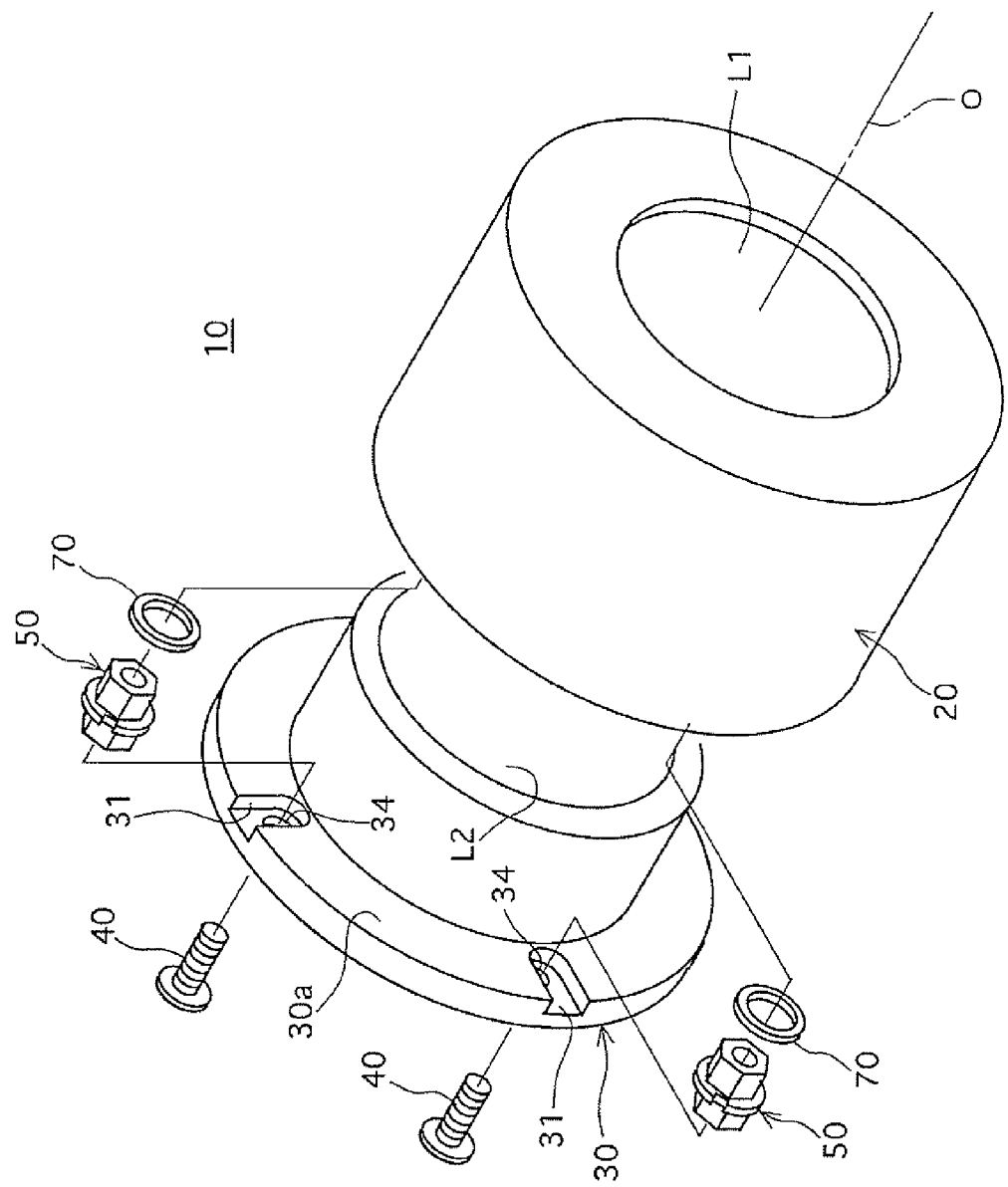
FIG. 2 is an exploded rear perspective view of the lens alignment apparatus according to the first embodiment of the present invention.
Figure 3:
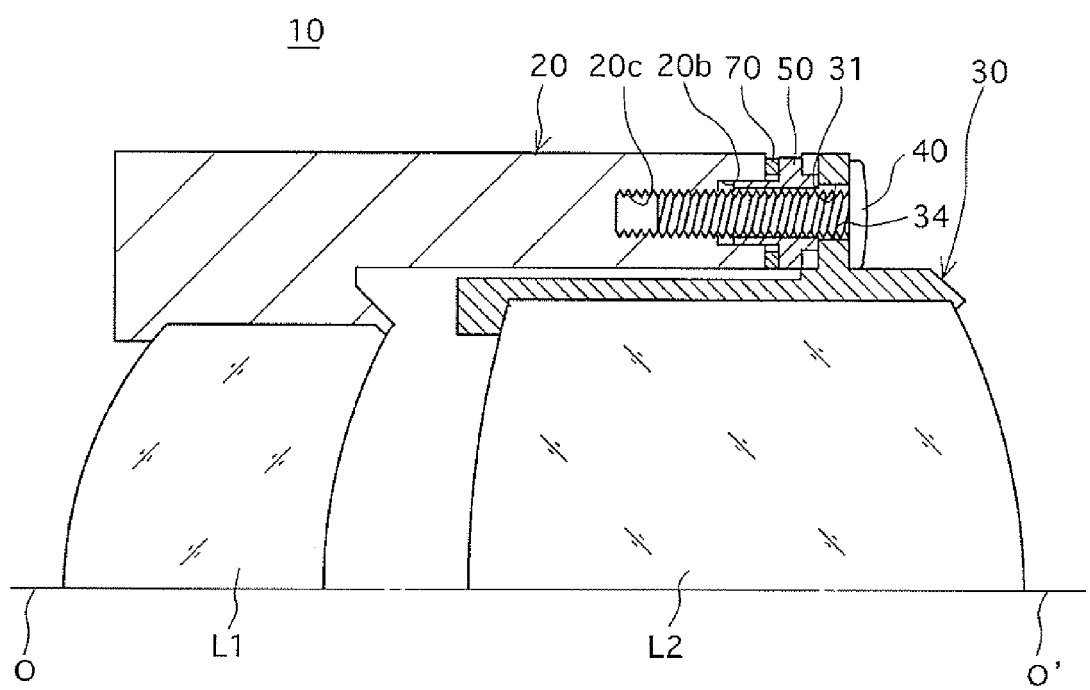
FIG. 3 is a sectional view of the lens alignment apparatus taken along the line III-III of FIG. 1, according to the first embodiment of the present invention.

FIGS. 1 through 3 show a first embodiment of a lens alignment apparatus 10 according to the present invention. The lens alignment apparatus 10 is adapted to carry out an adjustment to align the optical axis O of the main lens L1 with the optical axis O' of the adjusting lens L2. The main lens L1 which has a circular shape in a front elevation is held by a cylindrical main lens holding frame 20, and the adjusting lens L2 which has a circular shape in a front elevation is held by a cylindrical adjusting lens holding frame 30. The main lens holding frame 20 and the adjusting lens holding frame 30 are made of a material which cannot be elastically deformed (e.g., hard plastic) when viewed macroscopically. It is assumed that the optical axis O of the main lens L1 is identical to the axis of the main lens holding frame 20 and the optical axis O' of the adjusting lens L2 is identical to the axis of the adjusting lens holding frame 30.

The main lens holding frame 20 has an annular end surface 20a which lies in a plane perpendicular to the optical axis O. The adjusting lens holding frame 30 has an annular end surface 30a which lies in a plane perpendicular to the optical axis O' and which faces the annular end surface 20a of the main lens holding frame 20. The adjusting lens holding frame 30 is secured to the main lens holding frame 20 by securing screws 40 after the adjusting lens L2 is aligned with the main lens L1.

The end surface 20a of the main lens holding frame 20 is provided with twelve identical regular hexagonal holes (centering holes) 20b which are located on a circle, whose center is located on the optical axis O, and which are spaced at equal angular distances (30 degrees). The regular hexagonal holes 20b are each defined by three pairs of parallel planes which are opposed to each other, one pair of the parallel planes extending in the radial directions of the main lens holding frame 20. The regular hexagonal holes 20b have axes extending parallel with the optical axis O and are provided at the inner end portions thereof with internal threads (threaded holes 20c) (FIG. 3) in which the securing screws 40 can be screw-engaged.

The adjusting lens holding frame 30 is provided on its end surface 30a with four radial grooves 31 at circumferential positions corresponding to the regular hexagonal holes 20b. The radial grooves 31 are located on the same circle whose center is located on the optical axis O' and are spaced at equal angular intervals (90 degrees). The radial grooves 31 extend in the radial directions of the adjusting lens holding frame 30. The inner ends of the radial grooves 31 are closed so as to each form a U-shape thereat, and the outer ends thereof are open. The four radial grooves 31 are provided at their center portions with screw insertion holes 34.

Alignment members 50 are inserted between the regular hexagonal holes 20b of the main lens holding frame 20 and the radial grooves 31 of the adjusting lens holding frame 30 in order to adjust the position of the adjusting lens holding frame 30 in a plane perpendicular to the optical axis O (O').

The alignment member 50 includes a regular hexagonal pillar portion (centering pillar portion) 51 which can be inserted in the regular hexagonal hole 20b at different angular phases, an aligning portion 52 which can be engaged in the radial grooves 31 at any predetermined angular phase of the regular hexagonal pillar portion 51 with respect to the regular hexagonal hole 20b, and a flange portion 53 located between the regular hexagonal pillar portion 51 and the aligning portion 52. The alignment member 50 is provided on its center portion with a through hole 54 in which the securing screw 40 is inserted and which has an axis identical to the axis X of the regular hexagonal pillar portion 51.

Figure 4:
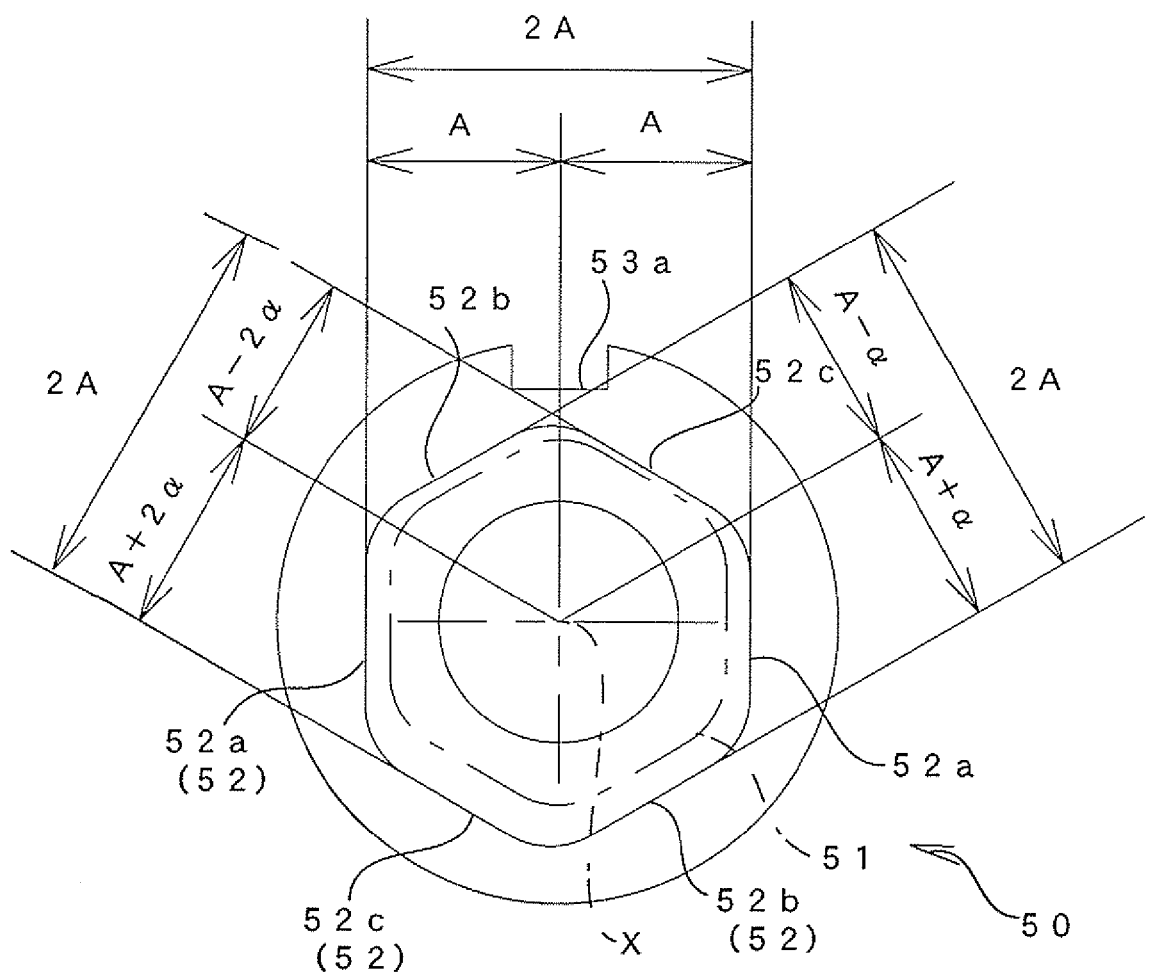
FIG. 4 is a front elevational view of an alignment member of the lens alignment apparatus according to the first embodiment of the present invention.

The aligning portion 52 is provided with three pairs of alignment surfaces 52a, 52b and 52c, as shown in FIG. 4, which can be engaged with the radial grooves 31. The alignment surfaces 52a, 52b and 52c are parallel with corresponding sides (surfaces) of the regular hexagonal pillar portion 51. Each pair of opposed alignment surfaces 52a 52b and 52c are parallel surfaces separated by a distance 2A (each pair of opposed alignment surfaces 52a 52b and 52c defines the same width therebetween). The distances from the axis X of the regular hexagonal pillar portion 51 to each alignment surface for each pair of alignment surfaces 52a 52b and 52c is different.

Figure 5:
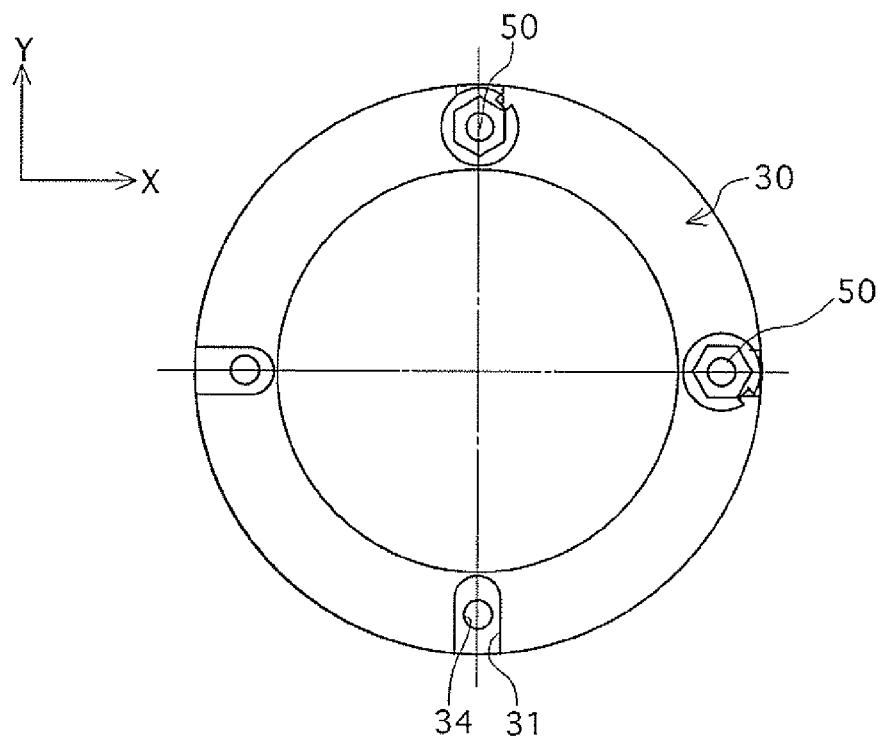
FIG. 5 is a front elevational view of an adjusting lens holding frame in which two alignment members are engaged, in the lens alignment apparatus according to the first embodiment of the present invention.

Namely, the median of a pair of alignment surfaces 52a of the aligning portion 52 is located on the axis X, i.e., the lengths of normal lines from the center axis X to the opposed alignment surfaces 52a are "A", which is exactly half of distance 2A. Therefore, when a pair of opposed alignment surfaces 52a are engaged with (or abut against) the radial groove 31 in the radial direction, no movement of the adjusting lens holding frame 30 relative to the main lens holding frame 20 in a direction perpendicular to the alignment surfaces 52a, i.e., in a direction perpendicular to an extension of the radial groove 31 in which the aligning portion 52 is fitted (or the direction X or Y, or the opposite direction thereto as indicated in FIG. 5), occurs. In other words, the amount of adjustment or the displacement for alignment is zero.

The median of a pair of alignment surfaces 52b of the aligning portion 52 is deviated by α from the axis X. Namely, the lengths of the normal lines from the axis X to the alignment surfaces 52b are (A+α) and (A−α), respectively. Therefore, when a pair of opposed alignment surfaces 52b are engaged with the radial groove 31, the adjusting lens holding frame 30 is moved by α, relative to the main lens holding frame 20 in a direction perpendicular to the alignment surfaces 52b (in the direction X or Y or the opposite direction thereto, see FIG. 5). Note that the amount of adjustment or the displacement for alignment is α.

The median of a pair of alignment surfaces 52c of the aligning portion 52 is deviated by 2α from the axis X. Namely, the lengths of the normal lines from the axis X to the alignment surfaces 52c are (A+2α) and (A−2α), respectively. Therefore, when a pair of opposed alignment surfaces 52c are engaged with the radial groove 31, the adjusting lens holding frame 30 is moved by 2α, relative to the main lens holding frame 20 in a direction perpendicular to the alignment surfaces 52c (in the direction X or Y or the opposite direction thereto, see FIG. 5). Note that the amount of adjustment or the displacement for alignment is 2α. The flange portion 53 is provided with a cut-away portion 53a which serves as an indicia to indicate the angular phase (angular position) of the aligning portion 52 (see FIG. 4).

The flange portion 53 of the alignment member 50 and the washer 70 determines the distance between the main lens holding frame 20 and the adjusting lens holding frame 30. Namely, when the adjusting lens holding frame 30 is secured to the main lens holding frame 20 by the securing screws 40, the flange portions 53 are disposed between the end surface 30a and the washers 70, and the washers 70 are disposed between the flange portions 53 and the end surface 20a.

Figure 6:
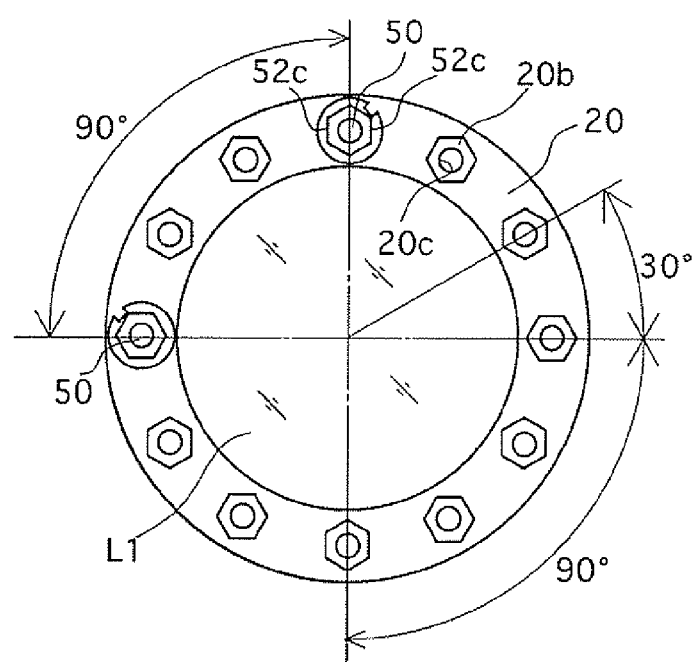
FIG. 6 is a front elevational view of a main lens holding frame in which two alignment members are inserted, in the lens alignment apparatus according to the first embodiment of the present invention.

The principle of alignment using the alignment apparatus will be discussed below. Four regular hexagonal holes 20b which are spaced at an angular distance of 90 degrees are selected from the twelve regular hexagonal holes 20b of the main lens holding frame 20, and the regular hexagonal pillar portions 51 of the alignment members 50 are inserted in the selected regular hexagonal holes. FIG. 6 shows two of the alignment members 50 inserted into two regular hexagonal holes 20b. The angular phase of the regular pillar portions 51 of the alignment members 50, as a reference position, is determined so that the alignment surfaces 52a of the regular hexagonal pillar portion 51 are oriented in the radial direction of the main lens holding frame 20 and the cut-away portion 53a is located on the outer peripheral surface side of the main lens holding frame 20. The alignment surfaces 52a of the aligning portions 51 are fitted in the radial grooves 31 of the adjusting lens holding frame 30. In this state, which corresponds to one of the adjustment positions, the alignment of the optical axis O of the main lens L1 with the optical axis O' of the adjusting lens L2 is checked with a conventional viewer (detector). If the alignment is complete (if the optical axis O and the optical axis O' are aligned), the adjusting lens holding frame 30 is secured to the main lens holding frame 20 by the securing screws 40.

In the secured position as mentioned above, for the sake of clarity, the alignment of the adjusting lens L2 (adjusting lens holding frame 30) in the direction X (FIG. 5) will be explained below using one alignment member 50. In the initially secured position, if the optical axes are not aligned, the alignment member 50 is detached and the angular phase is changed by 60 degrees in the forward or reverse direction in accordance with the observation result. Thereafter, the alignment surfaces 52b or 52c are oriented in the radial directions and the regular hexagonal portion 51 is fitted in the regular hexagonal hole 20b. If the alignment surfaces 52b are selected, the angular adjustment of α in the direction X is obtained and if the alignment surfaces 52c are selected, the angular adjustment of 2α is obtained.

Moreover, as a reference position, an angular phase can be selected in which the alignment surfaces 52a of the regular hexagonal pillar portion 51 are oriented in the radial direction of the main lens holding frame 20 and the cut-away portion 53a is located on the inner peripheral surface side of the main lens holding frame 20. The angular phase is changed by 60 degrees in the forward or reverse direction in accordance with the observation result. If the alignment surfaces 52b are engaged in the radial grooves 31, the angular adjustment of α in the direction opposite to the direction X is obtained. If the alignment surfaces 52c are engaged in the radial grooves 31, the angular adjustment of 2α in the direction opposite to the direction X is obtained. Accordingly, it is possible to carry out the stepwise adjustment in the direction X by the alignment members 50.

The adjustment in the direction Y can be equally carried out using the alignment members 50 whose positions are different by 90 degrees from the alignment members 50 that are used for the adjustment in the direction X. The adjustments in the directions X and Y can be carried out at one time using a pair of alignment members 50 which are diametrically opposed. Furthermore, it is possible to select the adjustment direction by optionally selecting the four regular hexagonal holes in which the alignment members 50 are to be inserted from among the twelve regular hexagonal holes 20b of the main lens holding frame 20.

Figure 7:
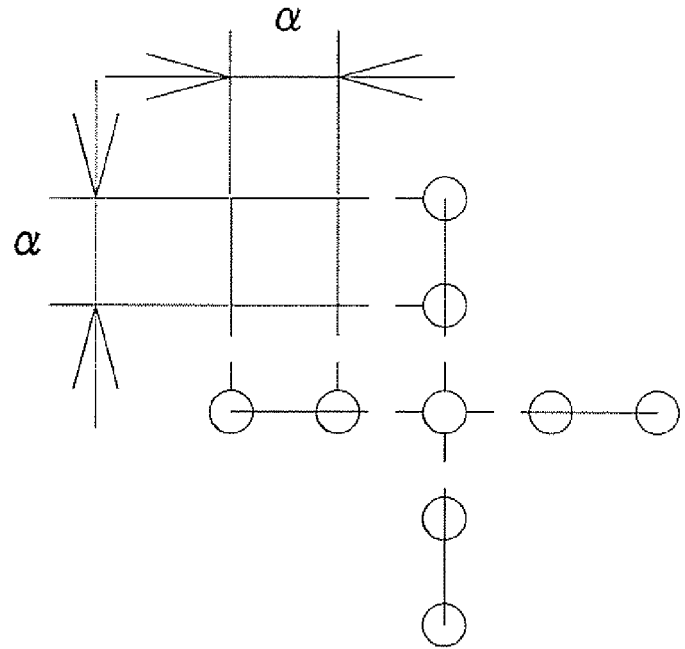
FIG. 7 is a diagram showing the adjustment range of one alignment member in the lens alignment apparatus according to the first embodiment of the present invention.
Figure 8:
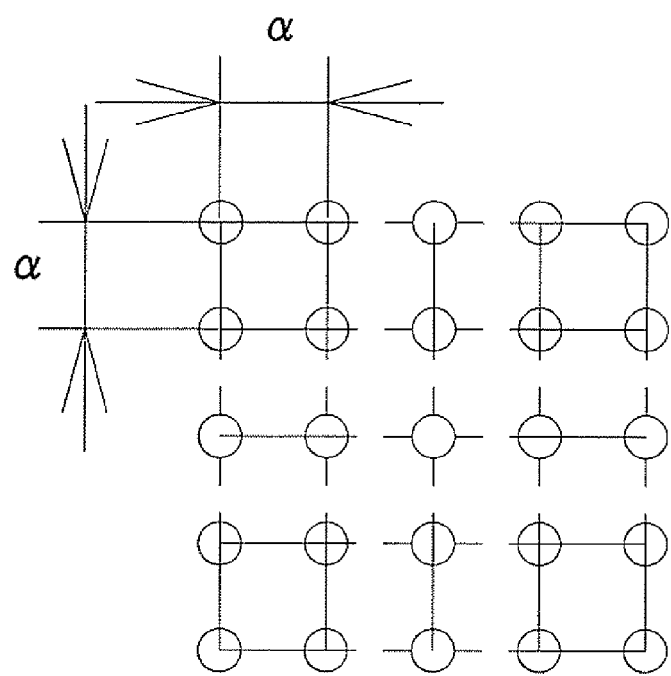
FIG. 8 is a diagram showing the adjustment range by two alignment members in the lens alignment apparatus according to the first embodiment of the present invention.
Figure 9:
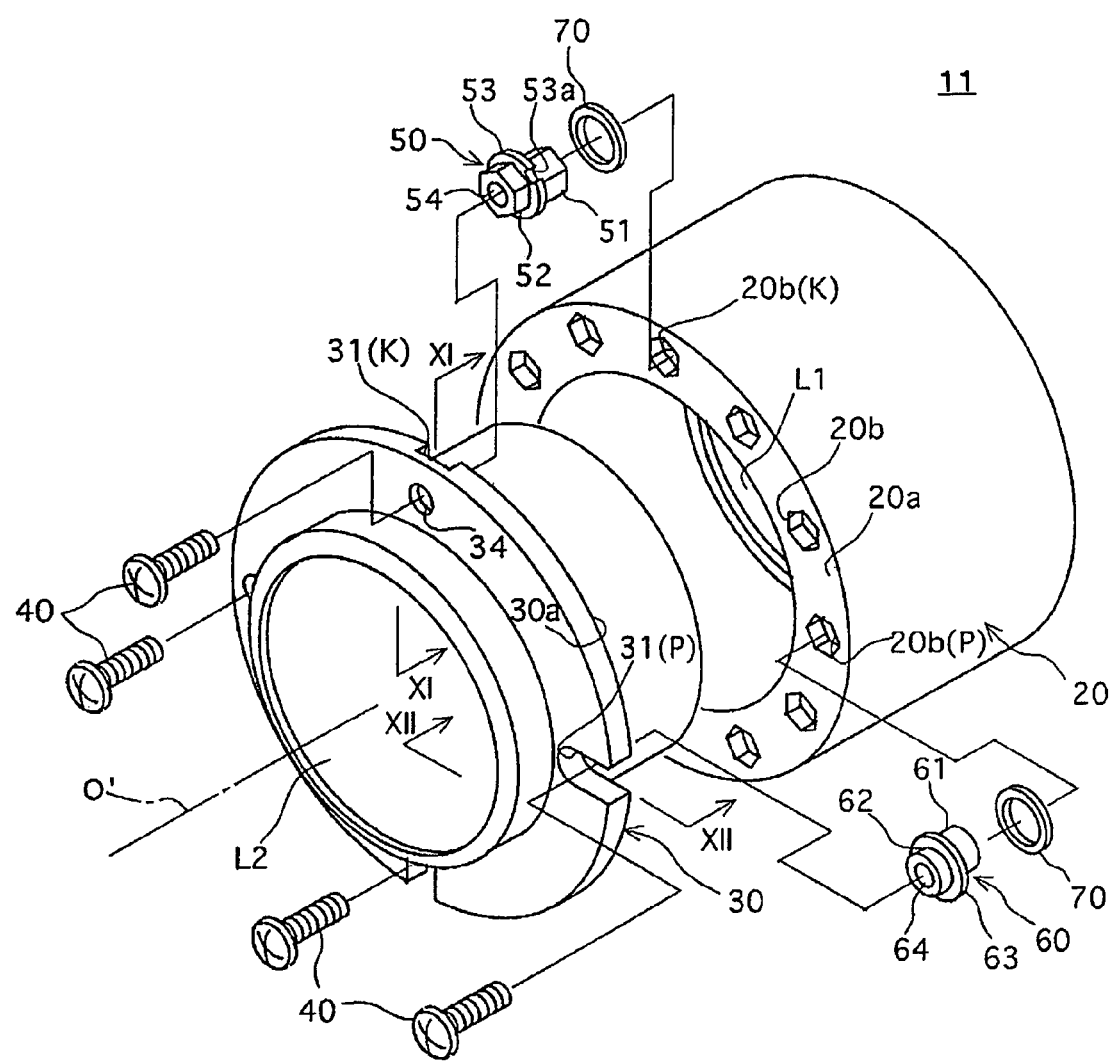
FIG. 9 is an exploded front perspective view of a lens alignment apparatus according to a second embodiment of the present invention.
Figure 10:
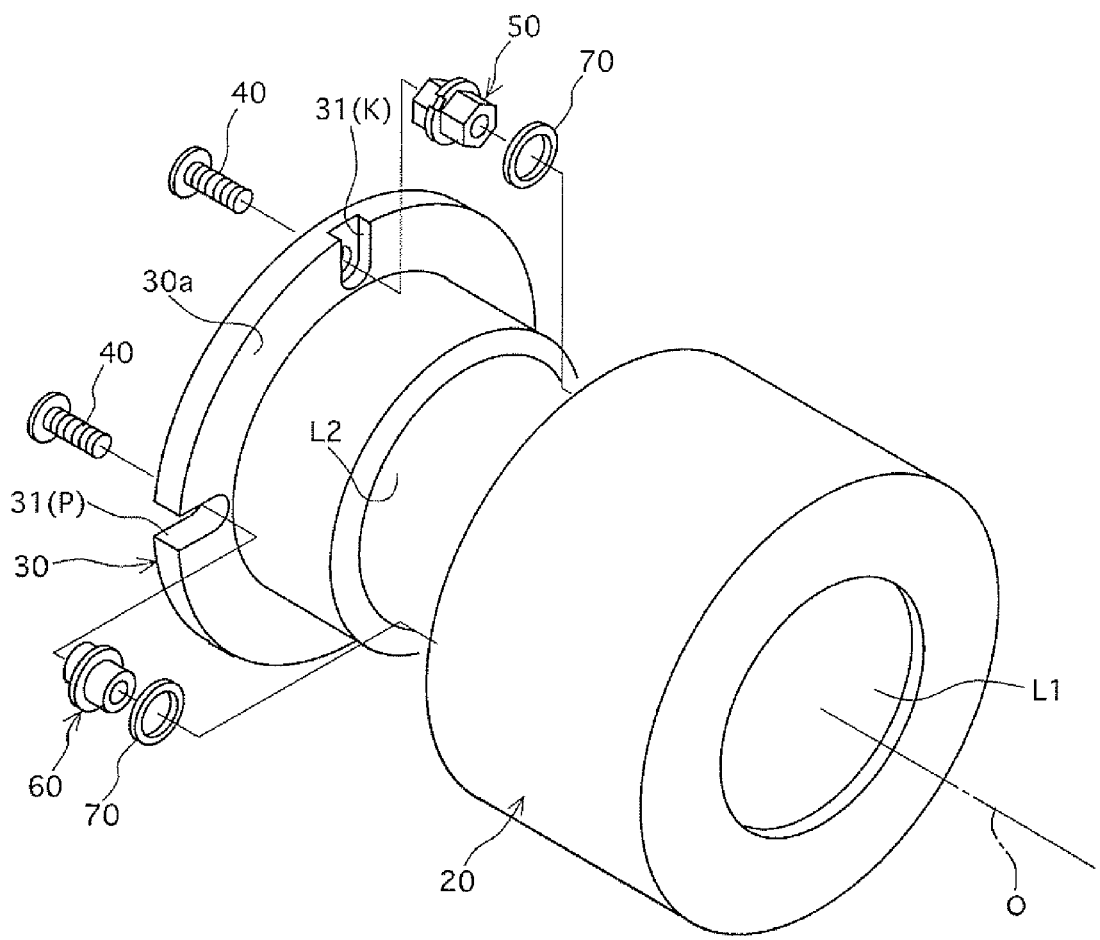
FIG. 10 is an exploded rear perspective view of the lens alignment apparatus according to the second embodiment of the present invention.
Figure 11:
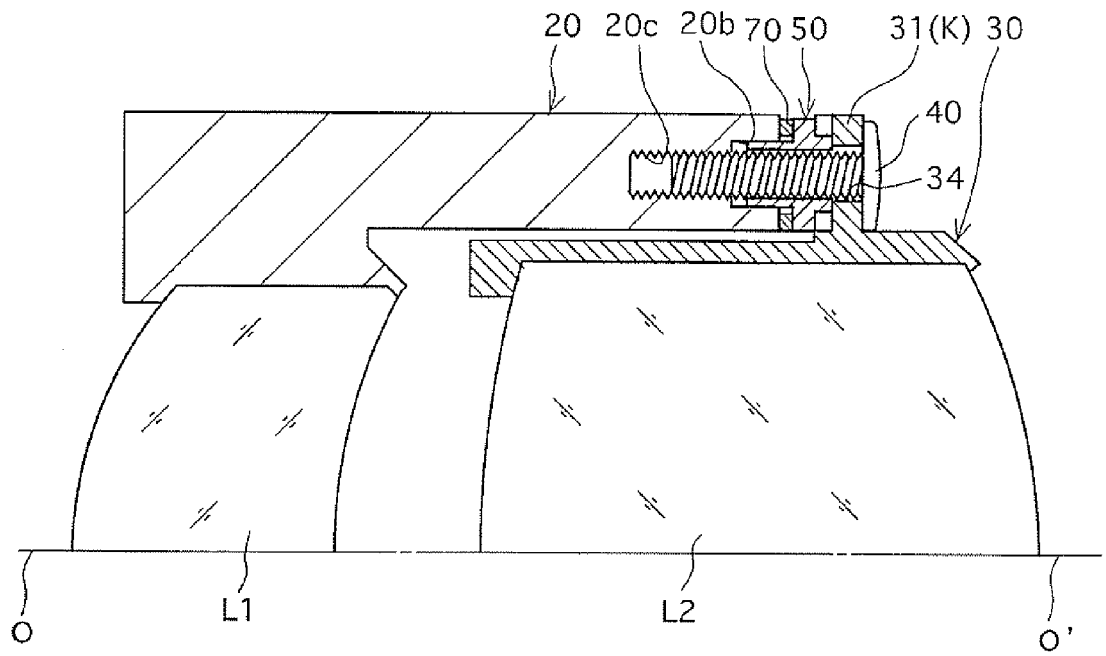
FIG. 11 is a sectional view of the lens alignment apparatus taken along the line XI-XI in FIG. 9, according to the second embodiment of the present invention.
Figure 12:
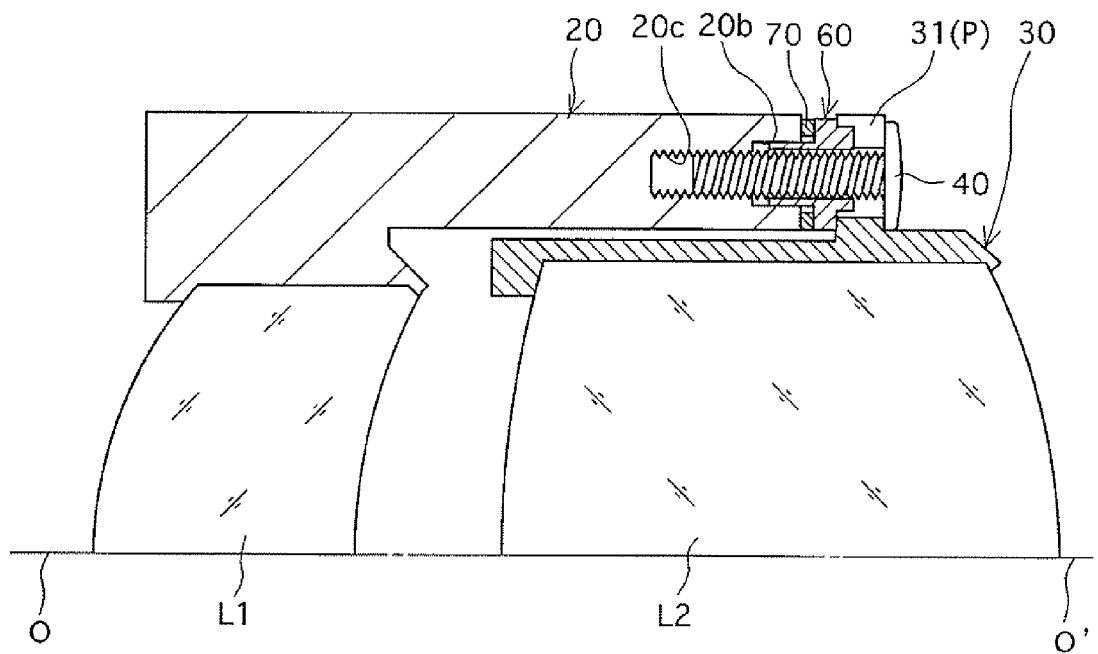
FIG. 12 is a sectional view of the lens alignment apparatus taken along the line XII-XII in FIG. 9, according to the second embodiment of the present invention.

FIGS. 7 and 8 show adjustment ranges in the X-Y directions in which the axis of the adjusting lens holding frame 30 can be moved with respect to the axis of the main lens holding frame 20. FIG. 7 shows the adjustment range of the adjusting lens holding frame 30 which is obtained by one alignment member 50 arranged on the axis X or Y while restricting the movement of the main lens holding frame 20 in the X-Y directions. FIG. 8 shows the adjustment range of the adjusting lens holding frame 30 which is obtained by two alignment members 50 arranged in the regular hexagonal holes 20b located on the axes X and Y, respectively, while restricting the movement of the main lens holding frame 20 in the X-Y directions. As can be understood from the foregoing, the optical axis position of the adjusting lens holding frame 30 can be selectively adjusted by the use of two alignment members 50 which are inserted in the two holes selected from the twelve regular hexagonal holes 20b. Moreover, even if the alignment members 50 are not diametrically opposed (on the axes X and Y), the adjustment in a limited range can be carried out by fitting two alignment members 50 in the optional regular hexagonal holes while restricting the movement of the main lens holding frame 20. In the present invention, the adjustment in a limited range can be performed even by a single alignment member 50, as shown in FIG. 7. If the alignment members 50 are fitted in the regular hexagonal holes 20b other than those located on the axes X and Y, the adjustment direction is inclined with respect to the directions X and Y, however, no change in the center takes place.

When lens products are mass produced, a specific disalignment tends to occur for each lot. Therefore, the alignment can be simplified and the time necessary for the alignment can be reduced by selecting in advance the regular hexagonal holes 20b in which the alignment members 50 are to be inserted and selecting in advance the alignment surfaces 52a, 52b and 52c of the alignment members 50. If the used alignment surfaces are remembered (recorded), the same adjusted state can be reproduced. The alignment surfaces 52a, 52b and 52c that are being used can be recognized by the cut-away portions 53a of the flange portions 53.

In the first embodiment of the present invention, the centering pillar portion of the alignment member 50 is made of the regular hexagonal pillar portion and, hence, the angular phase of the alignment member 50 can be determined on the pillar portion 51 side. However, the angular phase of the alignment member 50 can be determined by the alignment surfaces 52a, 52b and 52c, and accordingly, the regular hexagonal pillar portions 51 (and regular hexagonal holes 20b) can be replaced with circular pillar portions (and circular holes) which do not need to be formed with high precision.

Note that although the four radial grooves 31 are provided in the illustrated embodiment, the alignment members 50 may be inserted in only two (or one) radial grooves 31 and the remaining radial grooves can be merely in the form of securing holes. Moreover, in theory, the greater the number of the regular hexagonal holes 20b in which the alignment members 50 are selectively fitted, the better. Therefore, twelve regular hexagonal holes 20b are provided in the illustrated embodiment. However, in general, the practically acceptable number of regular hexagonal holes to provide a sufficient adjusting effect is at least eight. Although the regular hexagonal holes 20b are formed in the main lens holding frame 20 and the radial grooves 31 are formed in the adjusting lens holding frame 30 in the illustrated embodiment, it is possible to form the radial grooves 31 in the main lens holding frame 20 and to form the regular hexagonal holes 20b in the adjusting lens holding frame 30.

FIGS. 9 through 18 show a second embodiment of a lens alignment apparatus 11 according to the present invention. The second embodiment differs from the first embodiment mainly in the following areas (A) through (C).

(A). The twelve regular hexagonal holes (polygonal holes/alignment holes) 20b formed in the end surface 20a of the main lens holding frame 20 are selectively used as alignment-member regular hexagonal holes 20b(K) and alignment-pin regular hexagonal holes 20b(P).

(B). Four radial grooves 31 formed in the end surface 30a of the adjusting lens holding frame 30 include alignment-member radial grooves (bottomed grooves) 31(K) and alignment-pin radial through-grooves (through slots) 31(P). Each of the alignment-member radial grooves 31(K) is aligned with each respective alignment-pin radial through-grooves 31(P) along a straight line passing through the center of the adjusting lens holding frame 30.

(C). The alignment member 50 and the alignment pin 60 are selectively inserted between the regular hexagonal holes 20b of the main lens holding frame 20 and the alignment-member radial grooves 31(K) and alignment-pin radial through-grooves 31(P) of the adjusting lens holding frame 30, so that the adjusting lens holding frame 30 can be moved for adjustment in a plane perpendicular to the optical axis O (O').

The structure of the alignment member 50 is the same as that of the first embodiment. The aligning portion 52 of the alignment member 50 can be engaged in the alignment-member radial groove 31(K), regardless of the angular phase of the regular hexagonal pillar portion 51 with respect to the regular hexagonal hole 20b. In the second embodiment, the components corresponding to those of the first embodiment are designated with like reference numerals.

Figure 13:
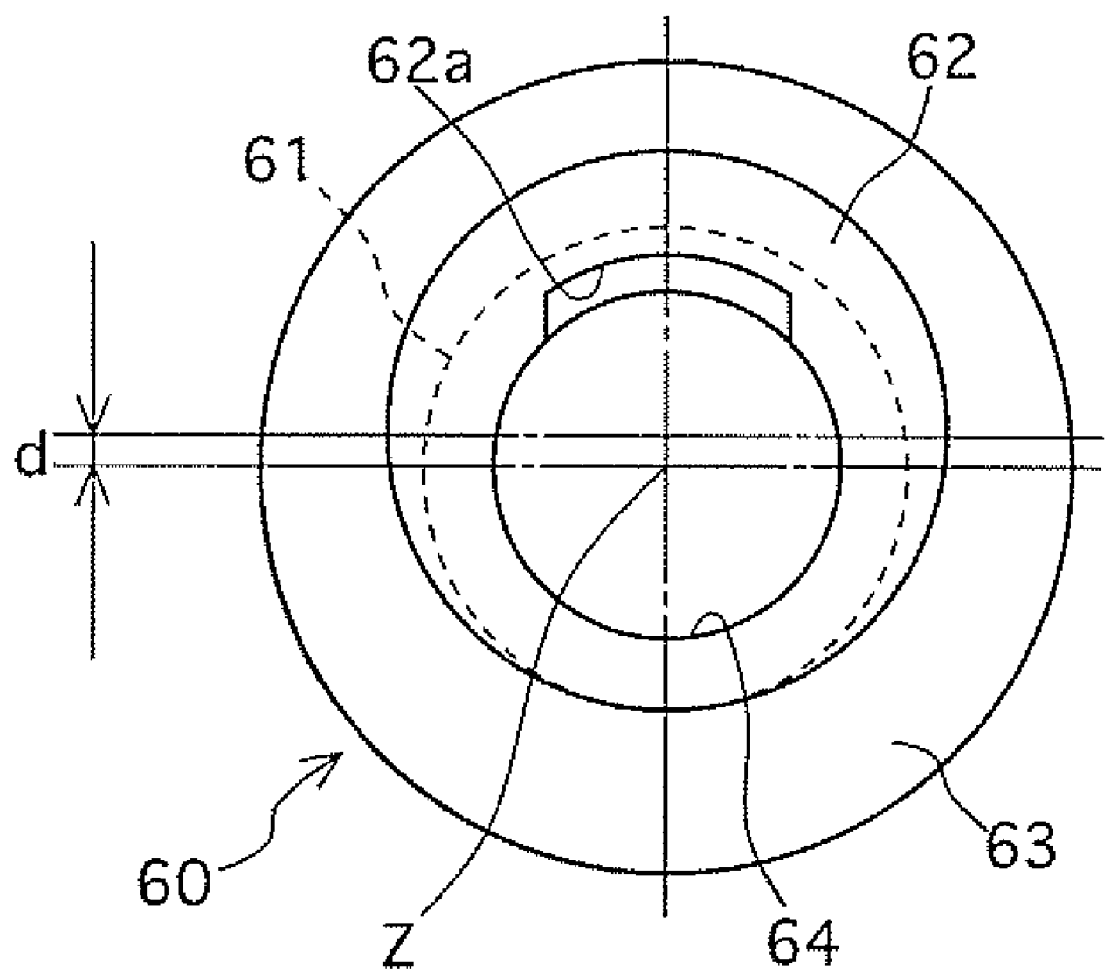
FIG. 13 is a front elevational view of an alignment pin of the lens alignment apparatus according to the second embodiment of the present invention.

As shown in FIG. 13, the alignment pin 60 includes a circular pillar portion 61 which can be inserted in the regular hexagonal hole 20b so as to relatively rotate, an eccentric pillar portion 62 which is eccentric with respect to the circular pillar portion 61, and a flange portion 63 located between the circular pillar portion 61 and the eccentric pillar portion 62. The alignment pin 60 is provided on its central portion with an insertion hole 64 through which the securing screws 40 is inserted and which has an axis identical to the axis Z of the circular pillar portion 61.

The diameter of the eccentric pillar portion 62 corresponds to the width of the alignment-pin radial through-groove 31(P) of the adjusting lens holding frame 30. The eccentric pillar portion 62 is provided, in the inner surface of the insertion hole 64, with a cut-away portion 62a which serves as an indicia indicating the angular phase (angular position) of the eccentric pillar portion. The axis of the eccentric pillar portion 62 is deviated from the axis Z of the circular pillar portion 61 by an eccentricity d. The eccentricity d of the alignment pin 60 is smaller than the minimum adjustment amount of the alignment member 50. Accordingly, the rotation of the eccentric pillar portion 62 (alignment pin 60) causes the adjusting lens holding frame 30 to finely move in a direction (directions X and Y, or the opposite directions thereof) (see FIGS. 15 and 16) perpendicular to an extension of the alignment-pin radial through-groove 31(P) of the adjusting lens holding frame 30 in which the alignment pin 60 is inserted.

The flange portion 53 of the alignment member 50 and the washer 70, and the flange portion 63 of the alignment pin 60 and the washer 70 define the frame distance between the main lens holding frame 20 and the adjusting lens holding frame 30. Namely, when the adjusting lens holding frame 30 is secured to the main lens holding frame 20 by the securing screws 40, the flange portion 53 (flange portion 63) is located between the end surface 20a and the end surface 30a and the washer 70 is located between the flange portion 53 (flange portion 63) and the end surface 20a.

The principle of alignment using the alignment apparatus 11 will be discussed below. Four regular hexagonal holes 20b in which the two alignment members 50 and the two alignment pins 60 are to be inserted are selected from the twelve regular hexagonal holes 20b of the main lens holding frame 20. The regular hexagonal pillar portions 51 of the alignment members 50 are inserted in the selected alignment-member regular hexagonal holes 20b(K), and the pillar portions 61 of the alignment pins 60 are inserted in the selected alignment-pin regular hexagonal holes 20b(P). The angular phase of the regular pillar portions 51 of the alignment members 50 is determined so that the alignment surfaces 52a of the regular hexagonal pillar portion 51 are oriented in the radial direction of the main lens holding frame 20, as a reference position, and the cut-away portion 53a is located on the outer peripheral surface side of the main lens holding frame 20. The alignment surfaces 52a of the aligning portions 51 are fitted in the alignment-member radial grooves 31(K) of the adjusting lens holding frame 30, and the eccentric pillar portions 62 of the alignment pins 60 are fitted in the alignment-pin radial through-grooves 31(P). In this state, which corresponds to one of the possible adjustment positions, the alignment of the optical axis O of the main lens L1 with the optical axis O' of the adjusting lens L2 is checked with a conventional viewer (detector). In this state, fine adjustment can be performed by rotating the alignment pin 60. The adjusting lens holding frame 30 is secured to the main lens holding frame 20 by the securing screws 40 upon the optical axes O and O' being aligned via the fine adjustment.

Figure 14:
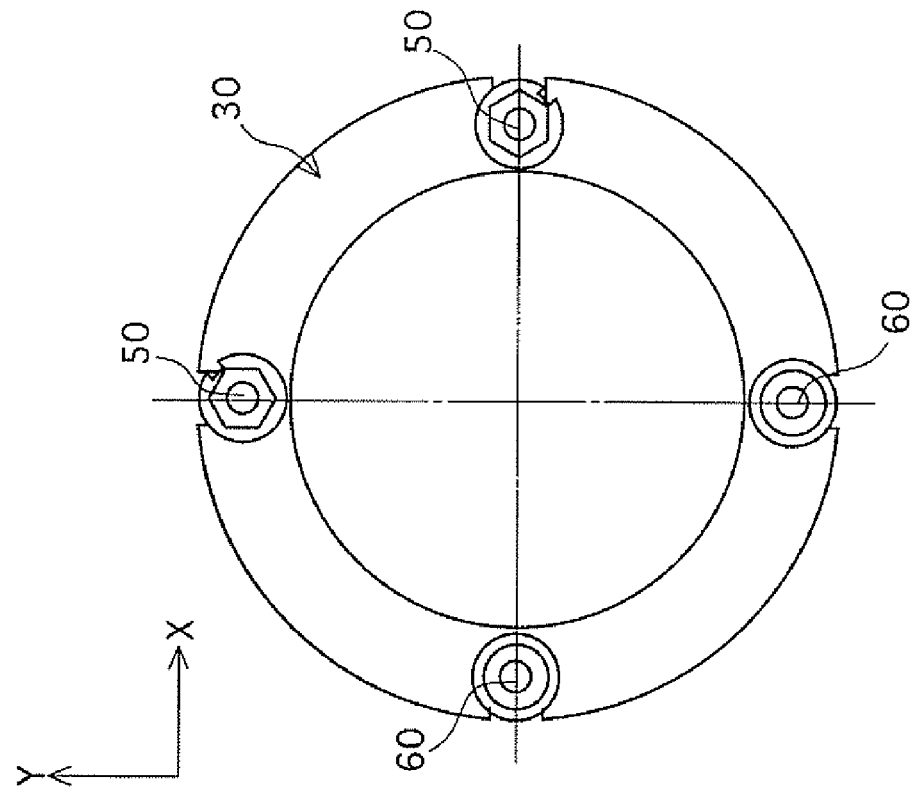
FIG. 14 is a front elevational view of an adjusting lens holding frame in which an alignment member and an alignment pin are engaged, in the lens alignment apparatus according to the second embodiment of the present invention.

In the above-described secured position, the alignment of the adjusting lens L2 (adjusting lens holding frame 30) in the direction X (FIG. 5) carried out by only one alignment member 50 and only one alignment pin 60, for the sake of clarity, is shown in FIG. 14 by way of example. In the initially secured position, if the optical axes O and O' are not aligned, the alignment member 50 is detached and the angular phase is changed by 60 degrees in the forward or reverse direction in accordance with the observation result. Thereafter, the alignment surfaces 52b or 52c are oriented in the radial directions and the regular hexagonal pillar portion 51 is fitted in the regular hexagonal hole 20b. If the alignment surfaces 52b are selected, the angular adjustment of a in the direction X is obtained and if the alignment surfaces 52c are selected, the angular adjustment of 2α is obtained.

Moreover, an angular phase can be selected as a reference position in which the alignment surfaces 52a of the regular hexagonal pillar portion 51 are oriented in the radial direction of the main lens holding frame 20 and the cut-away portion 53a is located on the inner peripheral surface side of the main lens holding frame 20. The angular phase is changed by 60 degrees in the forward or reverse direction in accordance with the observation result. If the alignment surfaces 52b are engaged in the radial grooves 31, the angular adjustment of α in the direction opposite to the direction X is obtained. If the alignment surfaces 52c are engaged in the radial grooves 31, the angular adjustment of 2α in the direction opposite to the direction X is obtained.

Consequently, after the stepwise adjustment by the alignment members 50 is achieved, the rotation of the alignment pins 60 causes a fine adjustment in the direction X. Furthermore, it is possible to select the adjustment direction by optionally selecting two regular hexagonal holes in which the alignment members 50 and the alignment pins 60 are to be inserted from among the twelve regular hexagonal holes 20b of the main lens holding frame 20.

Figure 15:
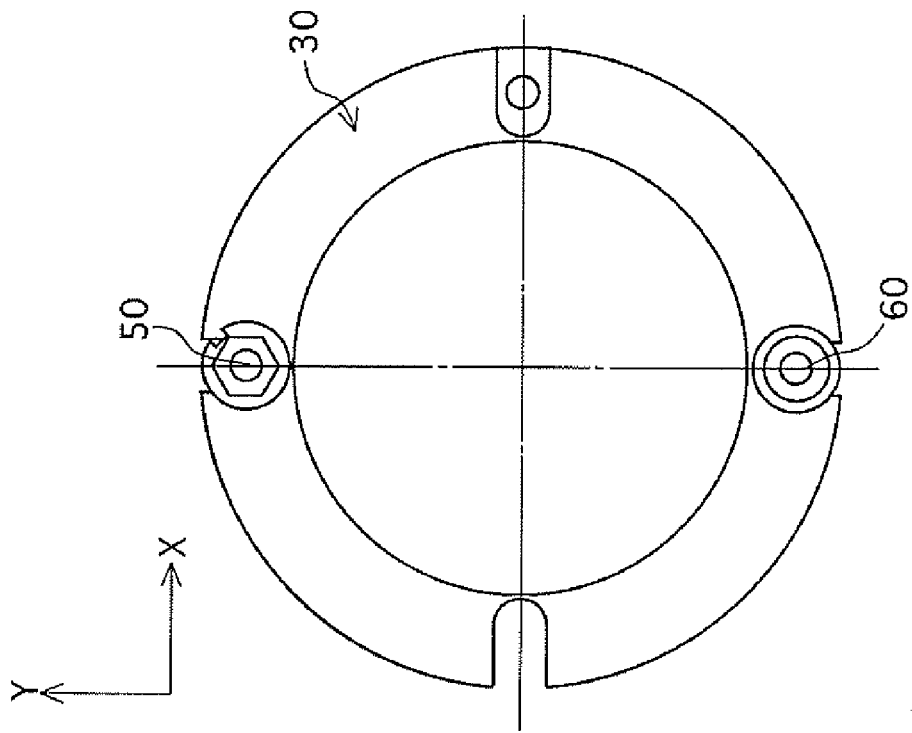
FIG. 15 is a front elevational view of the adjusting lens holding frame in which two alignment members and alignment pins are engaged, in the lens alignment apparatus according to the second embodiment of the present invention.
Figure 16:
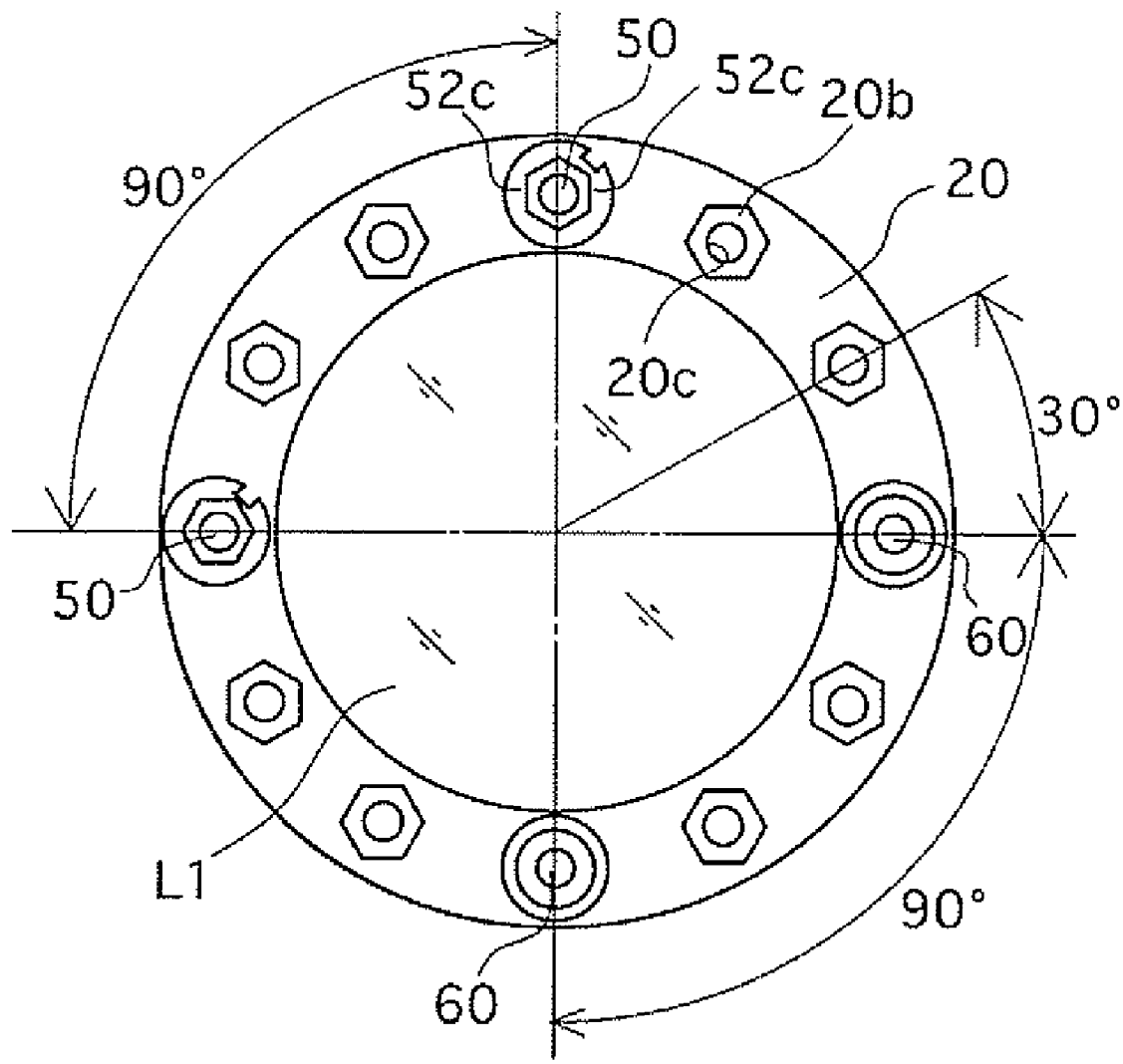
FIG. 16 is a front elevational view of a main lens holding frame in which two alignment members and two alignment pins are inserted, in the lens alignment apparatus according to the second embodiment of the present invention.

FIGS. 15 and 16 show an adjustment by two alignment members 50 and two alignment pins 60 which are arranged in two orthogonal directions. The two alignment members 50 are spaced at an angular distance of 90 degrees and the alignment pins 60 are diametrically opposed to the respective alignment members 50. Thus, the adjustment lens holding frame 30 can be moved relative to the main lens holding frame 20 within the range of 0 to 2α in the direction X, and 0 to 2α in the direction Y, by the two alignment members 50. Thereafter, a fine adjustment in the directions X and Y can be carried out by rotating the two alignment pins 60.

Figure 17:
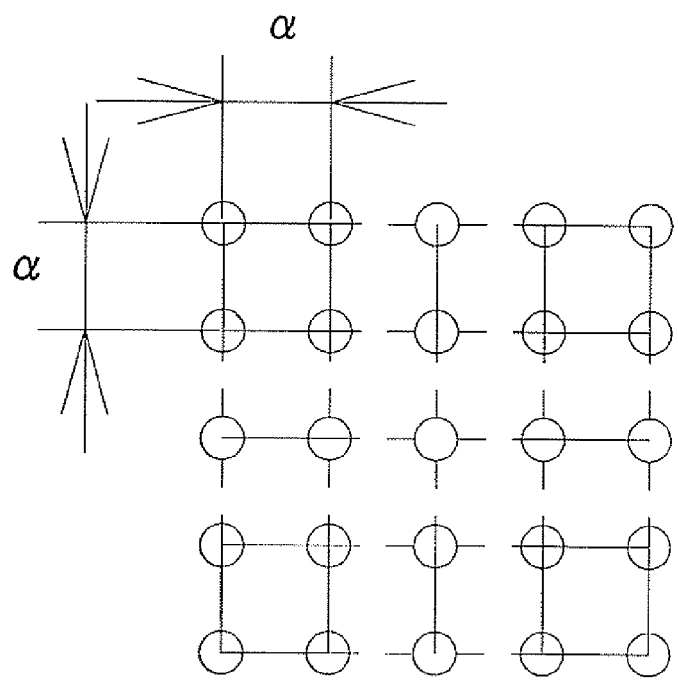
FIG. 17 is a diagram showing the adjustment range of an alignment member in the lens alignment apparatus according to the second embodiment of the present invention.
Figure 18:
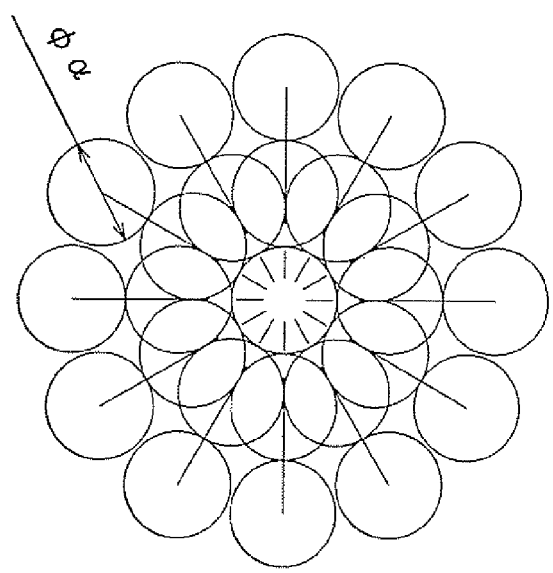
FIG. 18 is a diagram showing the adjustment range by an alignment member and an alignment pin in the lens alignment apparatus according to the second embodiment of the present invention.

FIGS. 17 and 18 show adjustment ranges in the X-Y directions in which the axis of the adjusting lens holding frame 30 can be moved with respect to the axis of the main lens holding frame 20. FIG. 17 shows the adjustment range of the adjusting lens holding frame 30 which is obtained by two alignment member 50 arranged in the regular hexagonal holes 20b on the axes X and Y, while restricting the movement of the main lens holding frame 20 in the X-Y directions. FIG. 18 shows the adjustment range of the adjusting lens holding frame 30 which is obtained by two alignment members 50 and the two alignment pins 60, arranged in the regular hexagonal holes 20b located on the axes X and Y, respectively, while restricting the movement of the main lens holding frame 20 in the X-Y directions.

As can be understood from the foregoing, the optical axis position of the adjusting lens holding frame 30 can be adjusted in all directions by a combination of the two alignment members 50 and the two alignment pins 60, arranged in orthogonal directions. However, an adjustment described with reference to FIG. 15 can be achieved by one alignment member 50 and one alignment pin 60. Moreover, even if the alignment member 50 and the alignment pin 60 are not aligned on the axis X or Y, an adjustment in a limited range can be carried out by fitting the alignment member 50 and the alignment pin 60 in the optional regular hexagonal holes 20b while restricting the movement of the main lens holding frame 20. Namely, in the present invention, an adjustment in a limited range can be performed even by a single alignment member 50 and a single alignment pin 60 which are not aligned along a straight line.

Accordingly, alignment can be simplified and the time necessary for the alignment to be carried out can be reduced by selecting in advance the regular hexagonal holes 20b in which the alignment members 50 and the alignment pins 60 are to be inserted, and selecting in advance the alignment surfaces 52a, 52b and 52c of the alignment members 50. The alignment surfaces 52a, 52b and 52c that are used can be recognized (remembered) by the cut-away portion 53a of the flange portion 53. Likewise, the angular position of the alignment pins 60 can be recognized (remembered) by the cut-away portion 62a.

Among the regular hexagonal holes 20b, the alignment-pin regular hexagonal holes 20b(P) in which the alignment pins 60 are inserted can be replaced with circular holes. However, if the alignment-pin regular hexagonal holes 20b(P) are used, as in the illustrated embodiment, the holes for the alignment pins can be commonly used for the alignment members 50. Moreover, in theory, the greater the number of regular hexagonal holes 20b, the better. However, in practice, at least eight regular hexagonal holes are provided. Although the regular hexagonal holes 20b are formed in the main lens holding frame 20 and the radial grooves 31 are formed in the adjusting lens holding frame 30 in the illustrated embodiment, it is possible to form the radial grooves 31 in the main lens holding frame 20 and to form the regular hexagonal holes 20b in the adjusting lens holding frame 30. The regular hexagonal pillar portion 51 of the alignment member 50 can be replaced with a circular pillar. In the case where the regular hexagonal pillar portion 51 of the alignment member 50 is replaced with a circular pillar, the circular pillar does not need to be formed with high precision.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens alignment apparatus comprising:
   a main lens holding frame having a main lens secured thereto;
   an adjusting lens holding frame to which an adjusting lens to be aligned with the main lens is secured;
   at least one radial groove formed in one of adjacent end surfaces of the main lens holding frame and the adjusting lens holding frame;
   a centering hole, corresponding to said radial groove, formed in the other of said adjacent end surfaces of the main lens holding frame and the adjusting lens holding frame; and
   an alignment member including a centering pillar portion inserted in said centering hole and an aligning portion engaged in said radial groove, said aligning portion being provided with a plurality of pairs of parallel alignment surfaces having an identical width and different distances from the axis of the centering pillar portion.

2. The lens alignment apparatus according to claim 1, comprising a pair of said radial grooves provided at angular intervals of 90 degrees.

3. The lens alignment apparatus according to claim 1, wherein the centering hole of the main lens holding frame and the centering pillar portion of the alignment member have interengageable polygonal shapes.

* * * * *